(12) United States Patent
Lai et al.

(10) Patent No.: US 9,140,949 B2
(45) Date of Patent: Sep. 22, 2015

(54) ARRAY SUBSTRATE, DISPLAY PANEL, DISPLAY DEVICE AND METHOD FOR DRIVING ARRAY SUBSTRATE

(71) Applicants: XIAMEN TIANMA MICRO-ELECTRONICS CO., LTD., Xiamen (CN); TIANMA MICRO-ELECTRONICS CO., LTD., Shenzhen (CN)

(72) Inventors: Qingjun Lai, Xiamen (CN); Wei Li, Xiamen (CN)

(73) Assignees: XIAMEN TIANMA MICRO-ELECTRONICS CO., LTD., Xiamen (CN); TIANMA MICRO-ELECTRONICS CO., LTD., Shenzhen (CN)

( * ) Notice: Subject to any disclaimer, the term of this patent is extended or adjusted under 35 U.S.C. 154(b) by 0 days.

(21) Appl. No.: 14/281,895

(22) Filed: May 20, 2014

(65) Prior Publication Data

US 2015/0177582 A1 Jun. 25, 2015

(30) Foreign Application Priority Data

Dec. 24, 2013 (CN) .......................... 2013 1 0722608

(51) Int. Cl.
 *G02F 1/1362* (2006.01)
(52) U.S. Cl.
 CPC ................................ *G02F 1/136286* (2013.01)

(58) Field of Classification Search
 CPC .................................................. G02F 1/136286
 See application file for complete search history.

(56) References Cited

U.S. PATENT DOCUMENTS

| 6,476,786 B1* | 11/2002 | Miyachi .......................... 345/90 |
| 2009/0009500 A1* | 1/2009 | Yamazaki et al. ............ 345/206 |
| 2011/0148827 A1* | 6/2011 | Ishida et al. ................... 345/204 |

FOREIGN PATENT DOCUMENTS

| CN | 101276075 A | 10/2008 |
| CN | 102832212 A | 12/2012 |
| KR | 1020100020396 A | 9/2011 |

* cited by examiner

*Primary Examiner* — Andrew Sasinowski
(74) *Attorney, Agent, or Firm* — Kilpatrick Townsend & Stockton LLP (57) ABSTRACT

Embodiments of the invention provide an array substrate, a display panel, a display device and a method for driving an array substrate. The array substrate includes gate lines, data lines, pixel TFTs and pixel electrodes and compensation capacitors on the array substrate; in every two adjacent rows of gate lines in at least a part of the rows on the array substrate, pixel TFTs connected with one gate line are a first type of TFTs, and pixel TFTs connected with an other gate line are a second type of TFTs; and in the at least a part of the rows, each of the pixel electrodes is arranged correspondingly with one of the compensation capacitors, and each of the compensation capacitors has one end electrically connected to the pixel electrode corresponding thereto and another end electrically connected to a gate line in a next row.

9 Claims, 6 Drawing Sheets

ARRAY SUBSTRATE, DISPLAY PANEL, DISPLAY DEVICE AND METHOD FOR DRIVING ARRAY SUBSTRATE

CROSS-REFERENCES TO RELATED APPLICATIONS

This application claims priority to Chinese patent application No. 201310722608.0 filed on Dec. 24, 2013, the content of which is incorporated herein by reference in its entirety for all purposes.

FIELD OF THE INVENTION

The present invention relates to the field of display technologies and particularly to an array substrate, a display panel, a display device and methods for driving an array substrate.

BACKGROUND OF THE INVENTION

An array substrate of a Thin Film Transistor-Liquid Crystal Display (TFT-LCD) is driven by a matrix of rows and columns, which is formed by intersecting N rows of gate lines and M columns of data lines, to control each pixel electrode in the matrix of rows and columns. Conventional solutions exist, but unfortunately they are inadequate for reasons explained below, and it is desirable to have new and improved systems and methods.

BRIEF SUMMARY OF THE INVENTION

Not Applicable.

DETAILED DESCRIPTION OF THE INVENTION

The present invention relates to the field of display technologies. Embodiments of the present invention provide an array substrate, a display panel, a display device and methods for driving an array substrate.

Figure 1A:
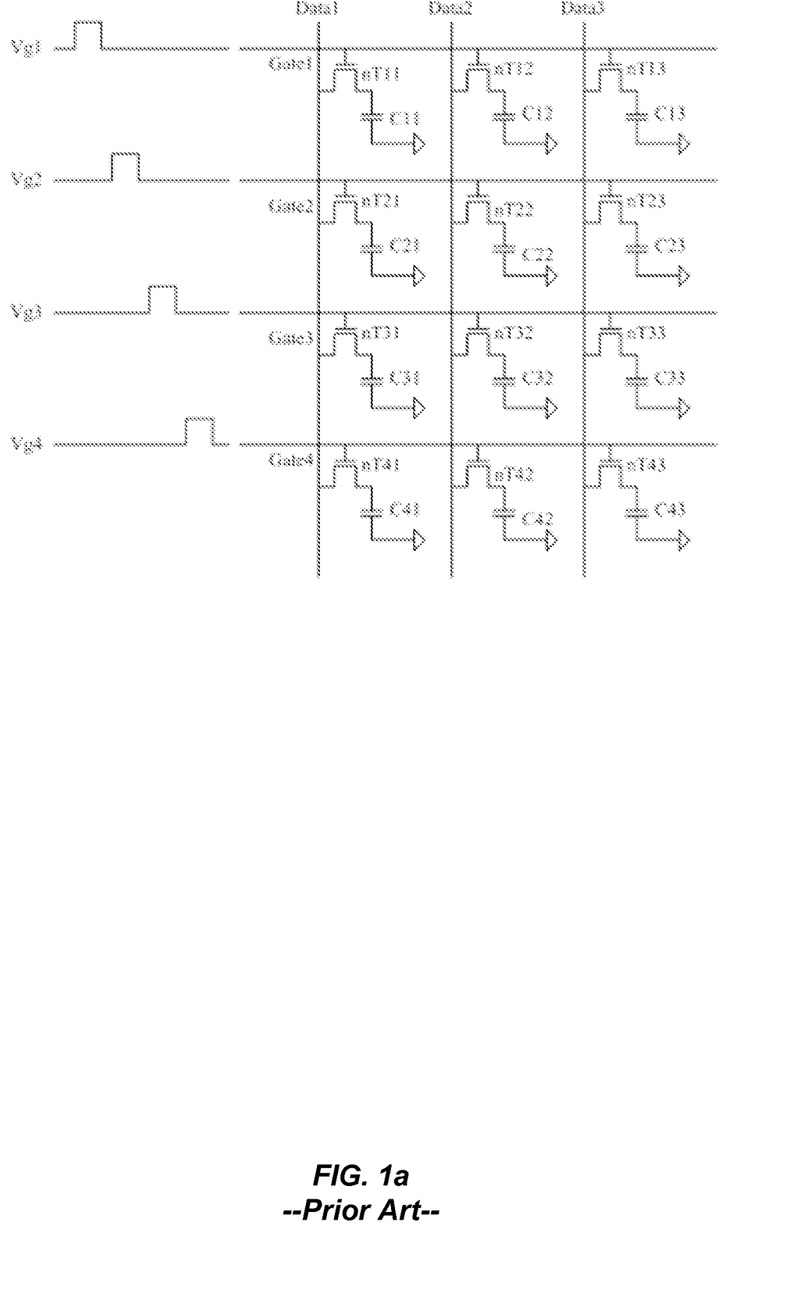
FIG. 1a and FIG. 1b are schematic diagrams of pixel circuits of a TFT-LCD in the prior art.
Figure 1B:
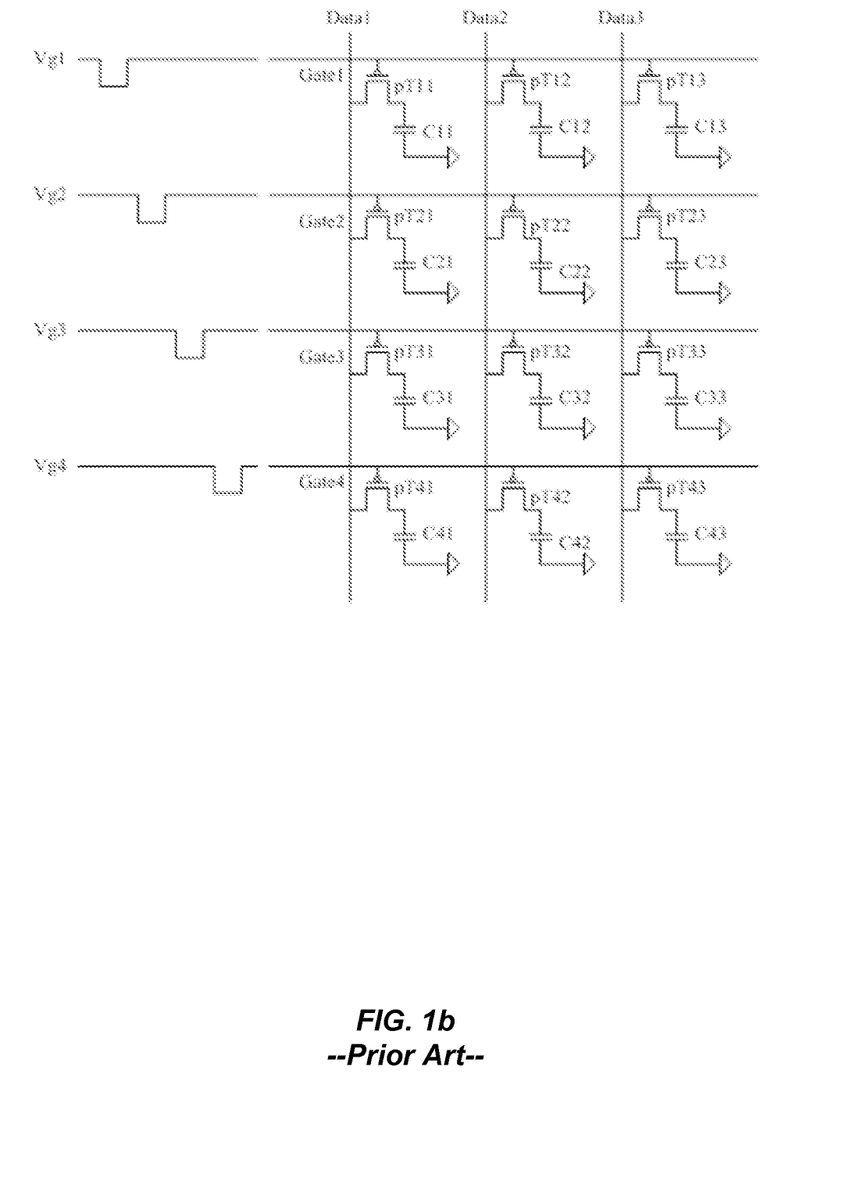

FIG. 1a and FIG. 1b are equivalent schematic diagrams of existing pixel circuits of the TFT-LCD, and in FIG. 1a and FIG. 1b, each TFT has a gate connected with a corresponding gate line, a source connected with a corresponding data line and a drain connected with one end of a corresponding storage capacitor, and the other end of the storage capacitor is connected with a common electrode line Vcom in the array substrate (the common electrode line Vcom is typically at a level of zero), and the one end of the storage capacitor connected with the drain of the TFT is connected with a pixel electrode (not illustrated in FIG. 1a and FIG. 1b). For example, in FIG. 1a, for a TFT nT22 at the second row and the second column, nT22 has a gate connected with a second gate line Gate2, a source connected with a second data line Data2 and a drain connected with one end of a storage capacitor C22, and the other end of the storage capacitor C22 is connected with a common electrode line Vcom. In FIG. 1b, for a TFT pT43 at the fourth row and the third column, pT43 has a gate connected with a fourth gate line Gate4, a source connected with a third data line Data3 and a drain connected with one end of a storage capacitor C43, and the other end of the storage capacitor C43 is connected with the common electrode line Vcom.

The difference between FIG. 1a and FIG. 1b lies in: each TFT in FIG. 1a is an N-type TFT, which is turned on when a voltage on a corresponding gate line is high level and turned off when the voltage on the corresponding gate line is low level; and each TFT in FIG. 1b is a P-type TFT, which is turned on when a voltage on a corresponding gate line is low level and turned off when the voltage on the corresponding gate line is high level.

In FIG. 1a, when a voltage Vg1 on a first gate line Gate1 is high level, TFTs connected with the first gate line, e.g., nT11, nT12, and nT13, are turned on, and when the voltage Vg1 on the first gate line is low level, the TFTs connected with the first gate line, e.g., nT11, nT12, and nT13, are turned off. The respective gate lines in FIG. 1a are driven sequentially, that is, firstly TFTs connected with the first gate line Gate1 are turned on, TFTs connected with a second gate line Gate2 are turned on after the TFTs connected with the first gate line Gate1 are turned off, TFTs connected with a third gate line Gate3 are turned on after the TFTs connected with the second gate line Gate2 are turned off, and so on. However, when TFTs connected with a gate line are turned off, voltage signals at one ends of storage capacitors connected with the TFTs connected with the gate line may decrease due to parasitic capacitors in the TFTs connected with the gate line, resulting in feed-through voltages which may lower voltage signals on pixel electrodes connected with the storage capacitors, so that the signals of the pixel electrodes may drive liquid crystals to display at gray scales other than gray scales intended to be displayed.

In FIG. 1b, when a voltage Vg1 on a first gate line Gate1 is low level, TFTs connected with the first gate line, e.g., pT11, pT12 and pT13, are turned on, and when the voltage Vg1 on the first gate line is high level, the TFTs connected with the first gate line, e.g., pT11, pT12 and pT13, are turned off. The respective gate lines in FIG. 1b are driven sequentially, that is, firstly TFTs connected with the first gate line Gate1 are turned on, TFTs connected with a second gate line Gate2 are turned on after the TFTs connected with the first gate line Gate1 are turned off, TFTs connected with a third gate line Gate3 are turned on after the TFTs connected with the second gate line Gate2 are turned off, and so on. However, when TFTs connected with a gate line are turned off, voltage signals at one ends of storage capacitors connected with the TFTs connected with the gate line may increase due to parasitic capacitors in the TFTs connected with the gate line, resulting in feed-through voltages which may raise voltage signals on pixel electrodes connected with the storage capacitors, so that the signals of the pixel electrodes may drive liquid crystals to display gray scales other than gray scales intended to be displayed.

In summary, in an existing display panel, when turned-on pixel TFTs are turned off, the feed-through voltages may occur due to the parasitic capacitors on the pixel TFTs, thus lowering (when the pixel TFTs are N-type TFTs) or raising (when the pixel TFTs are P-type TFTs) the voltages on the pixel electrodes connected with the pixel TFTs, so that the signals of the pixel electrodes may drive the liquid crystals to display gray scales other than gray scales intended to be displayed.

With respect to an array substrate, a display panel, a display device and a method for driving an array substrate according to embodiments of the invention, respective pixel TFTs connected with one of every two adjacent rows of gate lines in at least a part of rows of the array substrate are first type of TFTs, for example, preferably N-type TFTs, and respective pixel TFTs connected with another gate line are second type of TFTs, for example, preferably P-type TFTs, moreover, each pixel electrode in these parts of rows is arranged correspondingly with a compensation capacitor, which has one end electrically connected with the corresponding pixel electrode and another end electrically connected with a gate line in a next row, to reduce changes in voltages on the pixel electrodes when turned-on pixel TFTs connected with a preceding one of these two rows of gate lines are turned off, so that signals of the pixel electrodes can drive liquid crystals to display gray scales as close as possible to gray scales intended to be displayed.

Implementations of an array substrate, a display panel, a display device and a method for driving an array substrate according to embodiments of the invention are described below with reference to the drawings.

Figure 2:
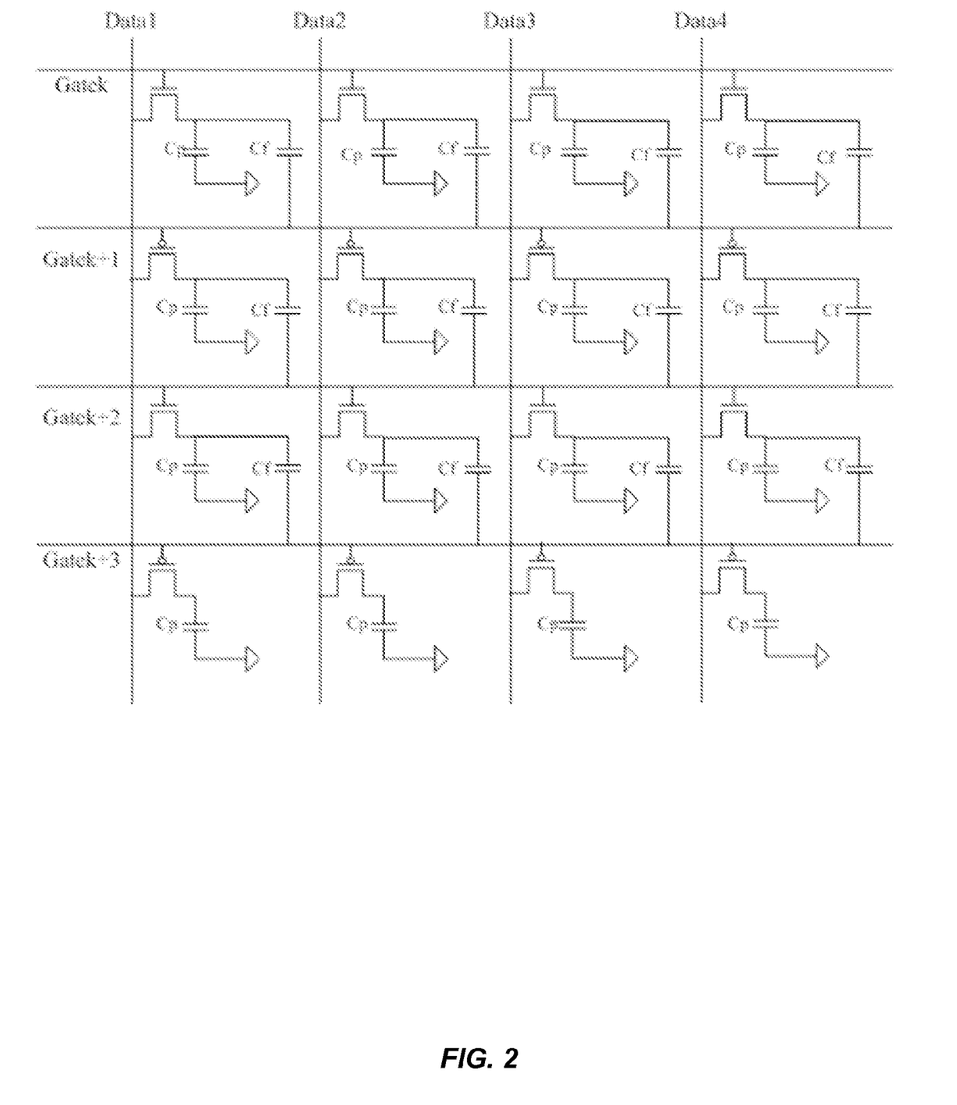
FIG. 2 is a schematic structural diagram of an array substrate according to an embodiment of the invention.

As illustrated in FIG. 2, an array substrate according to an embodiment of the invention includes: gate lines on the array substrate (only a k-th gate line to a (k+3)-th gate line are illustrated in FIG. 2, but it is to be appreciated k can be an integer greater than 4), data lines (only first four data lines among the data lines are illustrated in FIG. 2) on the array substrate, pixel TFTs and pixel electrodes (not illustrated in FIG. 2) on the array substrate, where each row of pixel TFTs have gates electrically connected with a gate line, for example, k-th row of pixel TFTs have gates electrically connected with the k-th gate line Gatek, (k+1)-th row of pixel TFTs have gates electrically connected with the (k+1)-th gate line Gatek+1, (k+2)-th row of pixel TFTs have gates electrically connected with the (k+2)-th gate line Gatek+2, and (k+3)-th row of pixel TFTs have gates electrically connected with the (k+3)-th gate line Gatek+3. Each column of pixel TFTs have first electrodes electrically connected with a data line, for example, a first column of pixel TFTs have first electrodes electrically connected with a first data line Data1, a second column of pixel TFTs have first electrodes electrically connected with a second data line Data2, a third column of pixel TFTs have first electrodes electrically connected with a third data line Data3, and a fourth column of pixel TFTs have first electrodes electrically connected with a fourth data line Data4. Each pixel TFT has a second electrode connected with a pixel electrode, and in FIG. 2, an equivalent capacitor Cp may be equivalently formed of a pixel electrode and a common electrode (the equivalent capacitor may alternatively be formed of a pixel electrode and another electrode as desired). It shall be noted that the first electrode and the second electrode as referred to are a source and a drain of the TFT, respectively, or may be altered accordingly for a different type of transistor. In every two adjacent rows of gate lines in at least a part of the rows on the array substrate (e.g., the four rows illustrated in FIG. 2), pixel TFTs connected with one gate line are a first type of TFTs (e.g., N-type TFTs), and pixel TFTs connected with another gate line are a second type of TFTs (e.g., P-type TFTs). The array substrate further includes compensation capacitors Cf on the array substrate. In the at least a part of the rows, each pixel electrode is arranged correspondingly with a compensation capacitor Cf, which has one end electrically connected to the pixel electrode and another end electrically connected to a gate line in a next row to the row in which the pixel electrode is located.

In FIG. 2, the pixel TFTs connected with the k-th gate line are N-type TFTs, the pixel TFTs connected with the (k+1)-th gate line are P-type TFTs, the pixel TFTs connected with the (k+2)-th gate line are N-type TFTs, and the pixel TFTs connected with the (k+3)-th gate line are P-type TFTs.

A liquid crystal material to which an electric field in a certain direction is applied for a long period of time may be polarized. To avoid this phenomenon, a driving electric field for the liquid crystal material is inverted in polarity in a certain period and applied to the liquid crystal material. Generally, frame-inverted driving is performed when displaying two adjacent frames, the voltages applied to a same pixel electrode have opposite polarities, so that the electric field formed between the pixel electrode and the common electrode is opposite in direction in the two adjacent frames. The display brightness depends on the intensity of the electric field between the pixel electrode and the common electrode, but independent of the direction of the electric field.

Figure 3:
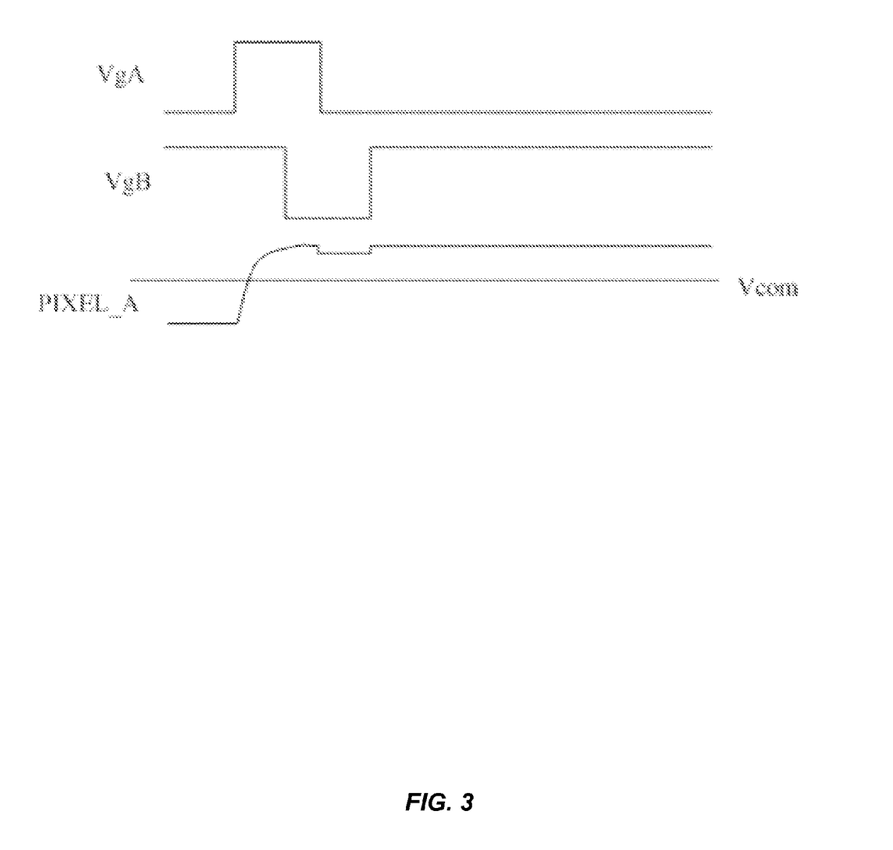
FIG. 3 is a schematic diagram of an operation principle of the array substrate according to an embodiment of the invention.

As illustrated in FIG. 3, pixel TFTs connected with a preceding gate line A of every two adjacent rows of gate lines in the at least a part of the rows in the array substrate are N-type TFTs, and pixel TFTs connected with a succeeding gate line B are P-type TFTs, and when a signal VgA on the gate line A is a high level signal, the pixel TFTs connected with the gate line A are turned on, and each of the pixel TFTs transmits a signal on its data line connected therewith to a pixel electrode connected therewith (the signal is stored by the equivalent capacitor Cp connected with the pixel electrode (see FIG. 2)). A turn-on time of the gate line B can be set, so that the pixel TFTs connected with the gate line B may be turned on while the pixel TFTs connected with the gate line A have not been turned off. It shall be noted that the turn-on time of the gate line B refers to a time to turn on the TFTs electrically connected with the gate line B, and a turn-off time of the gate line A refers to a time to turn off the TFTs electrically connected with the gate line A. A period of time for which the signal on the gate line A is at a high level overlaps with a period of time for which a signal VgB on the gate line B is at a low level, that is, the signal on the gate line B is changed from a high level to a low level, and the pixel TFTs electrically connected with the gate line B may also be turned on, in a part of the period of time during which the pixel TFTs connected with the gate line A are turned on. In this case, a voltage of one end of the compensation capacitor Cf connected with the gate line B may be lowered due to the low level on the gate line B. But since at this time the pixel electrodes connected with the pixel TFTs connected with the gate line A are being connected with the data line and being charged by the data lines, the voltage on the gate line B has no influence on the voltage on the pixel electrodes (the pixel electrodes PIXEL_A) connected with the pixel TFTs connected with the gate line A. And after the signal on the gate line A is changed from the high level to a low level, that is, the pixel TFTs connected with the gate line A are turned off, the voltage on the pixel electrodes connected with the pixel TFTs connected with the gate line A may decrease due to parasitic capacitance of the pixel TFTs connected with the gate line A. When the pixel TFTs connected with the gate line B are turned off, that is, the signal on the gate line B is changed from the low level to a high level, the voltage of the one end of the compensation capacitor Cf connected with the gate line B may increase. Since at this time the pixel TFTs connected with the gate line A are turned off, the voltage of the one end of the compensation capacitor Cf connected with the pixel TFTs connected with the gate line A floats and may vary with the voltage of the other end of the compensation capacitor Cf connected with the gate line B, that is, the voltage of the one end of the compensation capacitor Cf connected with the pixel TFTs connected with the gate line A may also increase, so the voltage on the pixel electrodes PIXEL_A connected with the gate line A may also increase, to cancel off an influence arising from the pixel electrodes PIXEL_A being lowered when the pixel TFTs connected with the gate line A are turned off. Thus, the voltage on the pixel electrodes PIXEL_A can drive liquid crystals to display gray scales closer to gray scales intended to be displayed. Vcom in FIG. 3 represents a voltage on the common electrodes, and this method can be applicable both when the voltage of the pixel electrodes PIXEL_A is negative, for example, when displaying a preceding frame of image, and when the voltage is positive, for example, when displaying a current frame of image, and this arrangement of the array substrate can enable the pixel electrodes present gray scales closer to the gray scales intended to be displayed.

Furthermore, rows in the array substrate according to an embodiment of the invention may be arranged as described above, that is, in every two adjacent rows of gate lines in all the rows on the array substrate, pixel TFTs connected with one gate line are N-type TFTs, and pixel TFTs connected with an other gate line are P-type TFTs. For example, in all of the rows, each pixel electrode is arranged correspondingly with a compensation capacitor, which has one end electrically connected with the pixel electrode corresponding thereto and another end electrically connected with a gate line in a next row.

If there is a shorter distance between a pixel TFT and a starting end of a gate line connected therewith, a change in voltage on the gate line with which the pixel TFT is connected may have a greater influence (that is, a feed-through voltage may have a greater influence) on a pixel electrode connected the pixel TFT. Thus, preferably, in the pixel TFTs electrically connected with a gate line, a capacitance of a compensation capacitor connected with a pixel TFT at a shorter distance from the starting end of the gate line is greater than a capacitance of a compensation capacitor connected with a pixel TFT at a longer distance from the starting end of the gate line.

In other words, for a pixel TFT A, a pixel TFT B and a pixel TFT C among pixel TFTs electrically connected with a gate line, if a distance between the pixel TFT A and a starting end (a transmitting end of a gate signal) of the gate line is the shortest, a distance between the pixel TFT B and the starting end of the gate line is the next shortest, and a distance between the pixel TFT C and the starting end of the gate line is the longest, then in three corresponding compensation capacitors, capacitance of a compensation capacitor connected with the pixel TFT A is the greatest, capacitance of a compensation capacitor connected with the pixel TFT B is the next greatest, and capacitance of a compensation capacitor connected with the pixel TFT C is the lowest.

A display panel according to an embodiment of the invention includes the array substrate according to the above embodiments of the invention. Preferably, the display panel may be a liquid crystal display panel including one of the array substrates according to the foregoing embodiments of the invention, a color filter substrate arranged in opposition to the array substrate and a liquid crystal layer formed between them. Of course, the display panel may also be other panels, e.g., an electronic paper panel, etc.

A display device according to an embodiment of the invention includes the display panel according to the above embodiments of the invention. When the display panel of the display device is a liquid crystal display panel, the display device may further include a backlight unit.

With the display panel and the display device according to the embodiments of the invention, in every two adjacent rows of gate lines in at least a part of the rows on the array substrate, the pixel TFTs connected with one gate line are N-type TFTs, and the pixel TFTs connected with the other gate line are P-type TFTs. If the pixel TFTs connected with a preceding one of the two adjacent rows of the gate lines in these rows are P-type TFTs, and the pixel TFTs connected with a succeeding gate line are N-type TFTs, then when the pixel TFTs connected with the preceding gate line are turned off, that is, a voltage on the preceding gate line is changed from a low level to a high level, a voltage on the pixel electrodes connected with the pixel TFTs connected with the gate line may rise due to a feed-through voltage, but when the pixel TFTs connected with the succeeding gate line are turned off, that is, a voltage on the succeeding gate line is changed from a high level to a low level, a drop in voltage can be coupled by the respective compensation capacitors onto their corresponding pixel electrodes connected with the pixel TFTs connected with the preceding gate line, to lower the voltage on the pixel electrodes connected with the pixel TFTs connected with the preceding gate line, and thus enabling a signal of the pixel electrodes to drive liquid crystals to display gray scales as close as possible to gray scales intended to be displayed. In a similar way, if the pixel TFTs connected with a preceding gate line of every two adjacent rows of gate lines in these rows are N-type TFTs, and the pixel TFTs connected with a succeeding gate line are P-type TFTs, then when the pixel TFTs connected with the preceding gate line are turned off, that is, a voltage on the preceding gate line is changed from a high level to a low level, a voltage on the pixel electrodes connected with the pixel TFTs connected with the preceding gate line may drop due to a feed-through voltage, but when the pixel TFTs connected with the succeeding gate line are turned off, that is, a voltage on the succeeding gate line is changed from a low level to a high level, this rise in voltage can be coupled by the compensation capacitor onto the pixel electrodes connected with the pixel TFTs connected with the preceding gate line, to raise the voltage on the pixel electrodes connected with the pixel TFTs connected with the preceding gate line, thus further enabling a signal of the pixel electrodes to drive liquid crystals to display gray scales as close as possible to gray scales intended to be displayed.

A method for driving an array substrate according to an embodiment of the invention is applicable to the array substrate according to the foregoing embodiments, where the array substrate may include gate lines on the array substrate, data lines on the array substrate, pixel TFTs and pixel electrodes on the array substrate, where each row of pixel TFTs have gates electrically connected correspondingly with a gate line, and each column of pixel TFTs have first electrodes electrically connected with a data line, and each pixel TFT has a second electrode connected with a pixel electrode, and the array substrate further includes compensation capacitors on the array substrate; and in every two adjacent rows of gate lines in at least a part of the rows on the array substrate, pixel TFTs connected with one gate line are N-type TFTs, and pixel TFTs connected with an other gate line are P-type TFTs; and in the at least a part of the rows, each of the pixel electrodes is arranged correspondingly with one of the compensation capacitors, and each of the compensation capacitors has one end electrically connected to the pixel electrode corresponding thereto and an other end electrically connected to a gate line in a next row, and the method for driving the array substrate includes:

For every two adjacent rows of gate lines in the at least a part of the rows, a first turn-on signal is output to a preceding one of the two adjacent rows of gate lines in a scanning cycle of the preceding gate line, so that the pixel TFTs electrically connected with the preceding gate line can be turned on by the first turn-on signal; and a second turn-on signal is output to a succeeding one of the two adjacent rows of gate lines in a scanning cycle of the succeeding gate line, so that the pixel TFTs electrically connected with the succeeding gate line can be turned on by the second enabling signal, where the scanning cycles of these two gate lines overlap with each other, and the first turn-on signal is opposite in phase to the second turn-on signal.

Taking the array substrate illustrated in FIG. 2 as an example, a first turn-on signal is output to the k-th (k is a positive integer) gate line Gatek in a scanning cycle of the k-th gate line Gatek, and since the pixel TFTs connected with the k-th gate line Gatek are N-type TFTs, the first turn-on signal is a high level signal; and a second turn-on signal is output to the (k+1)-th gate line Gatek+1 in a scanning cycle of the (k+1)-th gate line Gatek+1, and since the pixel TFTs connected with the (k+1)-th gate line Gatek+1 are P-type TFTs, the second turn-on signal is a low level signal, and the scanning cycle of the k-th gate line Gatek overlaps with the scanning cycle of the (k+1)-th gate line Gatek+1, that is, a period of time for which the first turn-on signal is the high level signal overlaps with a period of time for which the second turn-on signal is the low level signal, that is, the pixel TFTs connected with the (k+1)-th gate line Gatek+1 may be turned on while the pixel TFTs connected with the k-th gate line Gatek have not been turned off in a period of time.

Furthermore, the scanning cycles of the two adjacent rows of gate lines in the at least a part of the rows overlap may include: if the first gate line (which is in the first row) in the array substrate is not included in the part of the rows, then a scanning cycle of each gate line in the at least a part of the rows is divided into two periods of time, where signals transmitted on the data lines in the array substrate remain data signals displayed by the pixels electrically connected with a previous gate line in a preceding period of the two periods of time; and signals transmitted on the data lines are data signals to be displayed by the pixels electrically connected with the gate line in a succeeding period of the two periods of time.

Figure 4:
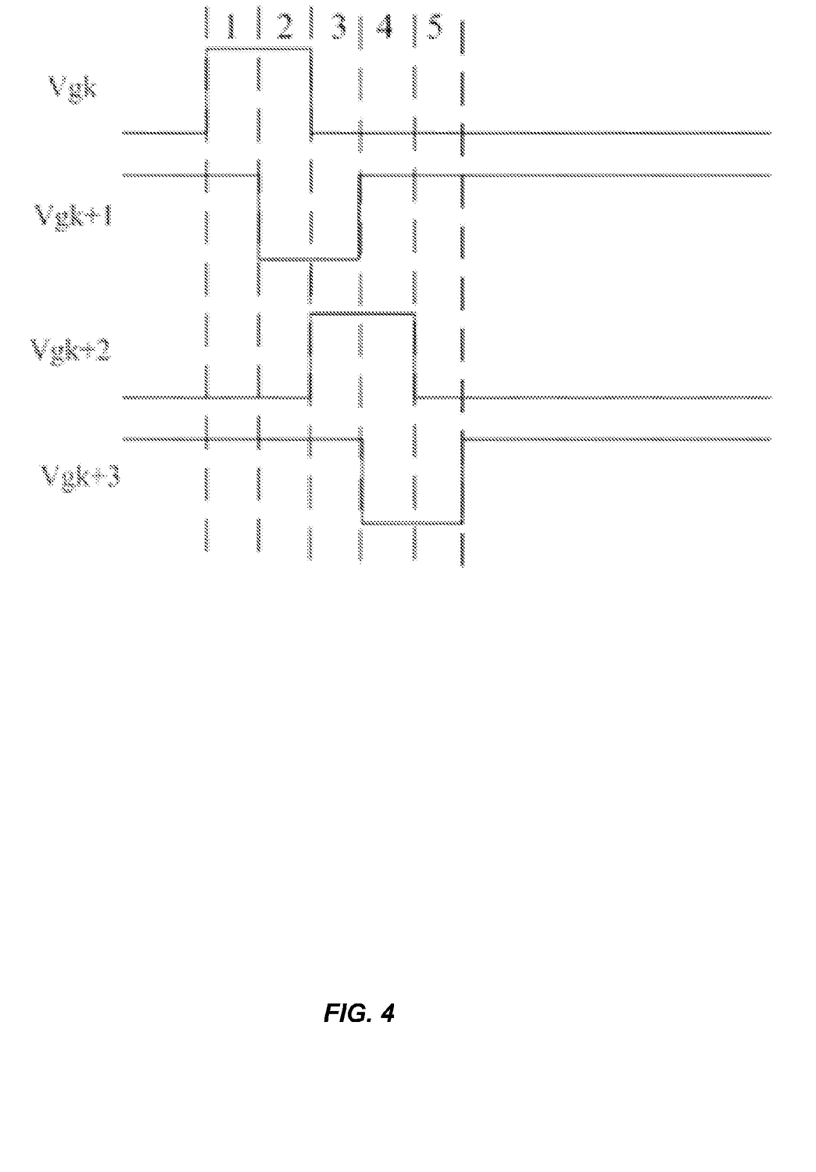
FIG. 4 is a timing diagram of signals on gate lines in the array substrate according to an embodiment of the invention.

As illustrated FIG. 4, for example, taking the array substrate illustrated in FIG. 2 as an example, when the k-th gate line Gatek is not the first gate line in the array substrate, a scanning cycle of the k-th gate line Gatek is divided into two periods of time: a first period of time and a second period of time, where in the first period of time, data signals displayed by pixels electrically connected with a (k−1)-th gate line Gatek−1 (not illustrated in FIG. 2) are transmitted on the respective data lines in the array substrate, and in the second period of time, data signals to be displayed by the pixels electrically connected with the k-th gate line Gatek are transmitted on the data lines in the array substrate, where Vgk represents a voltage on the k-th gate line Gatek to turn on the k-th row of pixel TFTs. A scanning cycle of the (k+1)-th gate line Gatek+1 is divided into two periods of time, which are the second period of time and a third period of time, where in the second period of time, data signals displayed by the pixels electrically connected with the k-th gate line Gatek are transmitted on the respective data lines in the array substrate, and in the third period of time, data signals to be displayed by the pixels electrically connected with the (k+1)-th gate line Gatek+1 are transmitted on the data lines in the array substrate, where Vgk+1 represents a voltage on the (k+1)-th gate line Gatek+1 to turn on the (k+1)-th row of pixel TFTs. A scanning cycle of the (k+2)-th gate line Gatek+2 is divided into two periods of time, which are the third period of time and a fourth period of time, where in the third period of time, data signals displayed by the pixels electrically connected with the (k+1)-th gate line Gatek+1 are transmitted on the respective data lines in the array substrate, and in the fourth period of time, data signals to be displayed by the pixels electrically connected with the (k+2)-th gate line Gatek+2 are transmitted on the respective data lines in the array substrate, where Vgk+2 represents a voltage on the (k+2)-th gate line Gatek+2 to turn on the (k+2)-th row of pixel TFTs. A scanning cycle of the (k+3)-th gate line Gatek+3 is divided into two periods of time, which are the fourth period of time and a fifth period of time, where in the fourth period of time, data signals displayed by the pixels electrically connected with the (k+2)-th gate line Gatek+2 are transmitted on the respective data lines in the array substrate, and in the fifth period of time, data signals to be displayed by the pixels electrically connected with the (k+3)-th gate line Gatek+3 are transmitted on the respective data lines in the array substrate, where Vgk+3 represents a voltage on the (k+3)-th gate line Gatek+3 to turn on the (k+3)-th row of pixel TFTs.

Or furthermore, in an embodiment, scanning cycles of the two adjacent rows of gate lines in the at least a part of the rows overlap may include: if the first gate line (which is in the first row) in the array substrate is included in the part of the rows, then a scanning cycle of each gate line other than the first gate line in the at least a part of the rows is divided into two periods of time, where signals transmitted on the data lines in the array substrate remain data signals displayed by the pixels electrically connected with a previous gate line in a preceding period of the two periods of time; and signals transmitted on the data lines in the array substrate are data signals to be displayed by the pixels electrically connected with the gate line in a succeeding period of the two periods of time.

When the first gate line on the array substrate is included in the at least a part of the rows, signals transmitted on the data lines in the array substrate may be data signals to be displayed by the pixels electrically connected with the first gate line in the scanning cycle of the first gate line, that is, the data signals are transmitted in the entire scanning cycle of the first gate line, which is not divided into periods of time.

Figure 5:
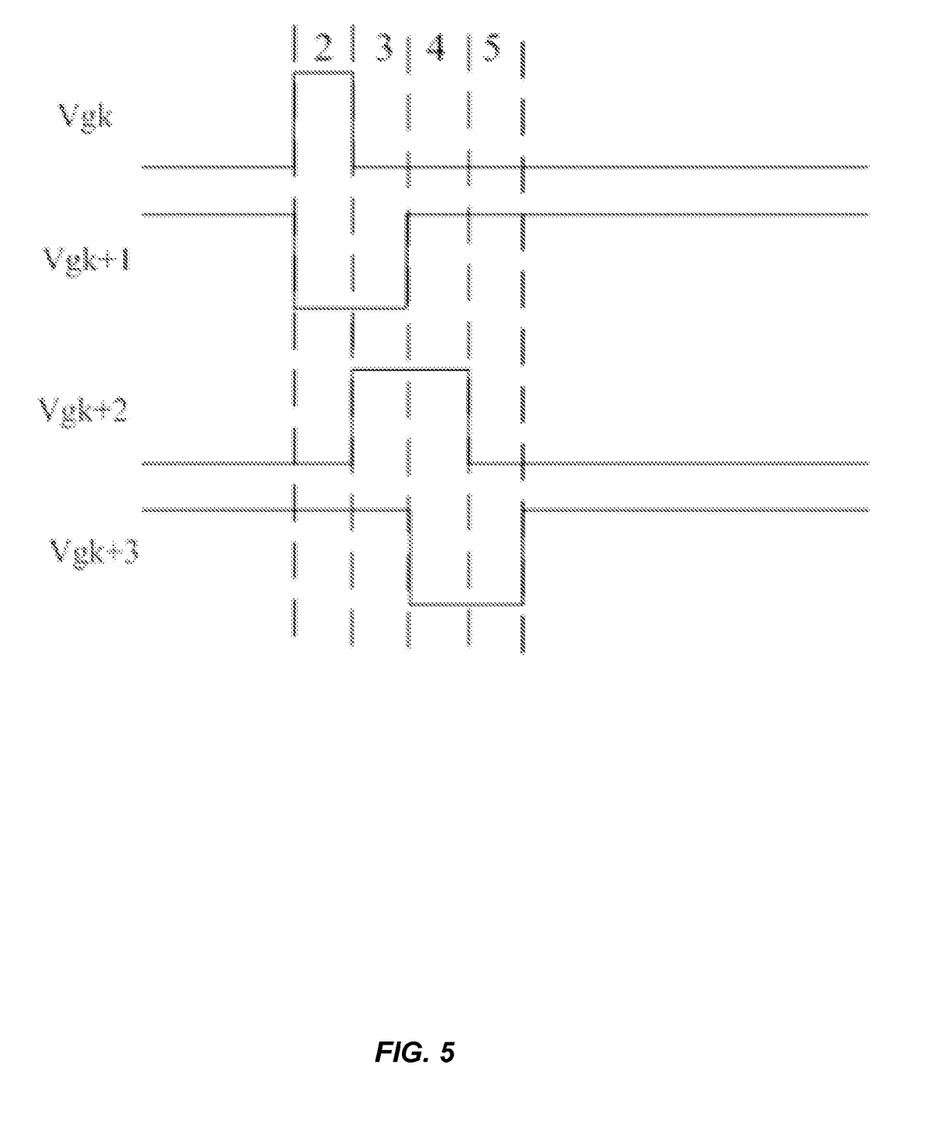
FIG. 5 is a timing diagram of signals on gate lines in the array substrate according to an embodiment of the invention.

As illustrated in FIG. 5, still taking the array substrate illustrated in FIG. 2 as an example, when the k-th gate line Gatek is the first gate line in the array substrate, that is, k=1, signals transmitted on the data lines in the array substrate are data signals to be displayed by the pixels electrically connected with the k-th gate line Gatek in the scanning cycle of the k-th gate line Gatek, i.e., a second period of time, where Vgk represents a voltage on the k-th gate line Gatek to turn on the k-th row of pixel TFTs; the data lines are driven in a scanning cycle of the (k+1)-th gate line Gatek+1 in a same way as the data lines are driven in the scanning cycle of the (k+1)-th gate line Gatek+1, which is illustrated in FIG. 4, where Vgk+1 represents a voltage on the (k+1)-th gate line Gatek+1 to turn on the (k+1)-th row of pixel TFTs; the data lines are driven in a scanning cycle of the (k+2)-th gate line Gatek+2 in a same way as the data lines are driven in the scanning cycle of the (k+2)-th gate line Gatek+2, which is illustrated in FIG. 4, where Vgk+2 represents a voltage on the (k+2)-th gate line Gatek+2 to turn on the (k+2)-th row of pixel TFTs; and the data lines are driven in a scanning cycle of the (k+3)-th gate line Gatek+3 in a same way as the data lines are driven in the scanning cycle of the (k+3)-th gate line Gatek+3, which is illustrated in FIG. 4, where Vgk+3 represents a voltage on the (k+3)-th gate line Gatek+3 to turn on the (k+3)-th row of pixel TFTs, and a repeated description thereof will be omitted here. It shall be noted that the foregoing description has been presented by way of an example in which the entire scanning cycle of the k-th gate line Gatek is the second period of time in FIG. 4 or FIG. 5, but the entire scanning cycle of the k-th gate line Gatek may be longer, that is, may include the total length of the first period of time illustrated in FIG. 4 and the second period of time illustrated in FIG. 4 but will not be limited to FIG. 5.

When the first gate line on the substrate array is included in the at least a part of the rows, the data lines may alternatively be driven in the scanning cycle of the first gate line as follows: the scanning cycle of the first scan line may also be divided into two periods of time, where signals transmitted on the data lines in the array substrate are preset signals in a preceding period of these two periods of times; and signals transmitted on the data lines in the array substrate are data signals to be displayed by the pixels electrically connected with the first gate line in a succeeding period of these two periods of times.

For example, taking the array substrate illustrated in FIG. 2 as an example, the k-th gate line Gatek is the first gate line (i.e., k=1) in the array substrate, and a scanning cycle of the k-th gate line Gatek is the same as the scanning cycle of the k-th gate line Gatek illustrated in FIG. 4 which is also divided into two periods of time, but here signals transmitted on the data lines in the array substrate are preset signals in a first period of time of the scanning cycle of the k-th gate line Gatek, where the preset signals may be level signals or other signals preset as desired. Data signals to be displayed by the pixels electrically connected with the k-th gate line Gatek are transmitted on the data lines in the array substrate in a second period of time. The data lines are driven in a scanning cycle of the other gate lines in a same way as the previous embodiment, and a repeated description thereof will be omitted here.

With the method for driving the array substrate according to the embodiments of the invention, in every two adjacent rows of gate lines in at least a part of the rows of the array substrate, the pixel TFTs connected with one gate line are N-type TFTs, and the pixel TFTs connected with the other gate line are P-type TFTs. If the pixel TFTs connected with a preceding gate line are P-type TFTs, and the pixel TFTs connected with a succeeding gate line are N-type TFTs, then when the pixel TFTs connected with the preceding gate line are turned off, that is, a voltage on the preceding gate line is changed from a low level to a high level, a voltage on the pixel electrodes connected with the pixel TFTs connected with the gate line may rise due to a feed-through voltage, but because of scanning cycles of the two adjacent rows of gate lines overlap with each other, that is, the pixel TFTs connected with the succeeding gate line may be turned on from a turn-off status while the pixel TFTs connected with the preceding gate line have not been turned off, and in this case the change in voltage on the next gate line will have no influence on the voltages of the pixel electrodes connected with the pixel TFTs connected with the preceding gate line. When the pixel TFTs connected with the succeeding gate line are turned off, that is, a voltage on the succeeding gate line is changed from a high level to a low level, this change in voltage will be coupled by the corresponding compensation capacitors onto the pixel electrodes connected with the pixel TFTs connected with the preceding gate line, to thereby lower the voltage on the pixel electrodes connected with the pixel TFTs connected with the preceding gate line, further enabling a signal of the pixel electrode to drive liquid crystals to display gray scales as close as possible to gray scales intended to be displayed. In a similar way, if the pixel TFTs connected with a preceding one of every two adjacent rows of gate lines in these part of rows are N-type TFTs, and the pixel TFTs connected with a succeeding gate line are P-type TFTs, then when the pixel TFTs connected with the preceding gate line are turned off, that is, a voltage on the preceding gate line is changed from a high level to a low level, a voltage on the pixel electrodes connected with the pixel TFTs connected with the gate line may drop due to a feed-through voltage, but because if the scanning cycles of the two adjacent rows of gate lines overlap with each other, that is, the turned-off pixel TFTs connected with the succeeding gate line may be turned on while the turned-on pixel TFTs connected with the preceding gate line have not been turned off, and in this case, the change in voltage on the next gate line will have no influence on the voltage of the pixel electrodes connected with the pixel TFTs connected with the preceding gate line. When the pixel TFTs connected with the succeeding gate line are turned off, that is, a voltage on the succeeding gate line is changed from a low level to a high level, this change in voltage will be coupled by the corresponding compensation capacitors onto the pixel electrodes connected with the pixel TFTs connected with the preceding gate line, to raise the voltage of the pixel electrodes connected with the pixel TFTs connected with the preceding gate line, further enabling a signal of the pixel electrode to drive liquid crystals to display gray scales as close as possible to gray scales intended to be displayed.

It is to be appreciated that the present invention can be implemented with various embodiments, which should not limit the scope of the claims. As an example, an embodiment of the invention provides an array substrate including: gate lines on the array substrate, data lines on the array substrate, pixel TFTs and pixel electrodes on the array substrate, wherein each row of pixel TFTs have gates electrically connected with a gate line, and each column of pixel TFTs have first electrodes electrically connected with a data line, and each pixel TFT has a second electrode electrically connected with a pixel electrode; and the array substrate further includes compensation capacitors on the array substrate;

in every two adjacent rows of gate lines in at least a part of the rows on the array substrate, pixel TFTs connected with one gate line are a first type of TFTs, and pixel TFTs connected with an other gate line are a second type of TFTs; and in the at least a part of the rows, each of the pixel electrodes is arranged correspondingly with one of the compensation capacitors, and each of the compensation capacitors has one end electrically connected to the pixel electrode corresponding thereto and an other end electrically connected to a gate line in a next row.

An embodiment of the invention provides a display panel including the array substrate according to embodiments of the invention.

An embodiment of the invention provides a display device including the display panel according to embodiments of the invention.

An embodiment of the invention provides a method for driving the array substrate, including:

for every two adjacent rows of gate lines in the at least a part of the rows, outputting a first turn-on signal to a preceding gate line of the two adjacent rows of gate lines in a scanning cycle of the preceding gate line, so that pixel TFTs electrically connected with the preceding gate line can be turned on by the first turn-on signal; and outputting a second turn-on signal to a succeeding gate line of the two adjacent row of gate lines in a scanning cycle of the succeeding gate line, so that pixel TFTs electrically connected with the succeeding gate line can be turned on by the second turn-on signal, wherein the scanning cycles of these two adjacent rows of gate lines overlap with each other, and the first turn-on signal is opposite in phase to the second turn-on signal. There are other embodiments as well.

Those skilled in the art can appreciate that the drawings are merely schematic diagrams of some preferred embodiments, and the modules or the flows in the drawings may not necessarily be required to practice the invention.

The embodiments of the invention are numbered above merely for the sake of a description but not to suggest any superiority of one embodiment to another.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

What is claimed is:

1. An array substrate comprising: gate lines on the array substrate, data lines on the array substrate, pixel TFTs and pixel electrodes on the array substrate, wherein each row of pixel TFTs have gates electrically connected with a gate line, and each column of pixel TFTs have first electrodes electrically connected with a data line, and each pixel TFT has a second electrode connected with a pixel electrode; and the array substrate further comprises compensation capacitors on the array substrate;

in every two adjacent rows of gate lines in at least a part of the rows on the array substrate, pixel TFTs connected with one gate line are a first type of TFTs, and pixel TFTs connected with an other gate line are a second type of TFTs; and in the at least a part of the rows, each of the pixel electrodes is arranged correspondingly with one of the compensation capacitors, and each of the compensation capacitors has one end electrically connected to the pixel electrode corresponding thereto and another end electrically connected to a gate line in a next row.

2. The array substrate according to claim 1, wherein in every two adjacent rows of gate lines in all the rows on the array substrate, the first type of pixel TFTs connected with one gate line are N-type TFTs, and the second type of pixel TFTs connected with the other gate line are P-type TFTs; and in all the rows, each of the pixel electrodes is arranged correspondingly with one of the compensation capacitors, and each of the compensation capacitors has one end electrically connected to the pixel electrode corresponding thereto and the other end electrically connected to a gate line in a next row.

3. The array substrate according to claim 1, wherein in the pixel TFTs electrically connected with a gate line, a capacitance of a compensation capacitor connected with a pixel TFT at a shorter distance from a starting end of the gate line is greater than a capacitance of a compensation capacitor connected with a pixel TFT at a longer distance from the starting end of the gate line.

4. A display panel, comprising an array substrate, wherein the array substrate comprises: gate lines on the array substrate, data lines on the array substrate, pixel TFTs and pixel electrodes on the array substrate, wherein each row of pixel TFTs have gates electrically connected with a gate line, and each column of pixel TFTs have first electrodes electrically connected with a data line, and each pixel TFT has a second electrode connected with a pixel electrode; and the array substrate further comprises compensation capacitors on the array substrate;

in every two adjacent rows of gate lines in at least a part of the rows on the array substrate, pixel TFTs connected with one gate line are a first type of TFTs, and pixel TFTs connected with an other gate line are a second type of TFTs; and in the at least a part of the rows, each of the pixel electrodes is arranged correspondingly with one of the compensation capacitors, and each of the compensation capacitors has one end electrically connected to the pixel electrode corresponding thereto and an other end electrically connected to a gate line in a next row.

5. A method for driving an array substrate, wherein the array substrate comprises gate lines on the array substrate, data lines on the array substrate, pixel TFTs and pixel electrodes on the array substrate, wherein each row of pixel TFTs have gates electrically connected with a gate line, and each column of pixel TFTs have first electrodes electrically connected with a data line, and each pixel TFT has a second electrode connected with a pixel electrode; and the array substrate further comprises compensation capacitors on the array substrate;

in every two adjacent rows of gate lines in at least a part of the rows on the array substrate, pixel TFTs connected with one gate line are a first type of TFTs, and pixel TFTs connected with an other gate line are a second type of TFTs; and in the at least a part of the rows, each of the pixel electrodes is arranged correspondingly with one of the compensation capacitors, and each of the compensation capacitors has one end electrically connected to the pixel electrode corresponding thereto and an other end electrically connected to a gate line in a next row, and wherein the method comprises:

for every two adjacent rows of gate lines in the at least a part of the rows, outputting a first turn-on signal to a preceding gate line of the two adjacent rows of gate lines in a scanning cycle of the preceding gate line, so that pixel TFTs electrically connected with the preceding gate line can be turned on by the first turn-on signal; and outputting a second turn-on signal to a succeeding gate line of the two adjacent rows of gate lines in a scanning cycle of the succeeding gate line, so that pixel TFTs electrically connected with the succeeding gate line can be turned on by the second turn-on signal, wherein the scanning cycles of these two adjacent rows of gate lines overlap with each other, and the first turn-on signal is opposite in phase to the second turn-on signal.

6. The method according to claim 5, wherein the scanning cycles of the two rows of adjacent gate lines overlap with each other comprises:

if a first gate line in the array substrate is included in the at least a part of the rows, a scanning cycle of each gate line other than the first gate line in the at least a part of the rows is divided into two periods of time; and signals transmitted on the data lines in the array substrate are data signals displayed by the pixels electrically connected with a previous gate line in a preceding period of the two periods of time; and signals transmitted on the data lines are data signals to be displayed by the pixels electrically connected with the gate line in a succeeding period of the two periods of time.

7. The method according to claim 6, further comprising: signals transmitted on the data lines are data signals to be displayed by the pixels electrically connected with the first gate line in a scanning cycle of the first gate line.

8. The method according to claim 6, further comprising: a scanning cycle of the first gate line is divided into two periods of time; and signals transmitted on the data lines in the array substrate are preset signals in a preceding period of the two periods of times, and signals transmitted on the data lines in the array substrate are data signals to be displayed by the pixels electrically connected with the first gate line in a succeeding period of the two periods of time.

9. The method according to claim 5, wherein the scanning cycles of the two adjacent rows of gate lines overlap with each other comprises:

if a first gate line in the array substrate is not included in the at least a part of the rows, a scanning cycle of each gate line in the at least a part of the rows is divided into two periods of time, and signals transmitted on the data lines in the array substrate are data signals displayed by the pixels electrically connected with a previous gate line in a preceding period of the two periods of time; and signals transmitted on the data lines are data signals to be displayed by the pixels electrically connected with the gate line in a succeeding period of the two periods of time.

* * * * *